United States Patent [19]

Chang et al.

[11] Patent Number: 4,788,107
[45] Date of Patent: Nov. 29, 1988

[54] SUBSTRATES COATED WITH NONAQUEOUS COMPOSITIONS COMPRISING ACRYLIC POLYMERS CONTAINING HYDROLYZABLE MOIETIES FROM ORGANOSILANE COMPOUNDS

[75] Inventors: Wen H. Chang, Gibsonia; Paul J. Prucnal; John R. Peffer, both of Pittsburgh; Edward L. Dufford, Sarver; Ronald R. Ambrose, Allison Park, all of Pa.

[73] Assignee: PPG Industries, Inc., Pittsburgh, Pa.

[21] Appl. No.: 88,357

[22] Filed: Aug. 24, 1987

Related U.S. Application Data

[62] Division of Ser. No. 728,973, Apr. 30, 1985, Pat. No. 4,714,738.

[51] Int. Cl.$^4$ .............................................. B32B 9/04
[52] U.S. Cl. ........................................ 428/447; 525/58; 525/61; 525/100; 525/328.8; 525/342
[58] Field of Search ............... 525/61, 58, 100, 128.8, 525/342; 428/447

[56] References Cited

U.S. PATENT DOCUMENTS

| | | | |
|---|---|---|---|
| 3,644,566 | 2/1972 | Kincheloe et al. | 525/100 |
| 4,093,673 | 6/1978 | Chang et al. | 525/100 |
| 4,191,713 | 4/1980 | Yonezawa et al. | 525/102 |
| 4,243,767 | 1/1981 | Kaufman et al. | 525/102 |
| 4,317,762 | 3/1982 | Kratel et al. | 525/100 |
| 4,368,294 | 1/1983 | Deubzer et al. | 525/100 |
| 4,399,261 | 8/1983 | Kato et al. | 525/342 |
| 4,419,505 | 12/1983 | Ratkowski et al. | 525/100 |
| 4,446,292 | 5/1984 | Chang et al. | 528/29 |
| 4,467,081 | 8/1984 | Chang et al. | 528/26 |
| 4,472,465 | 9/1984 | Burrill | 427/387 |
| 4,491,650 | 1/1985 | Rizk et al. | 525/102 |
| 4,501,872 | 2/1985 | Chang et al. | 528/18 |

FOREIGN PATENT DOCUMENTS 126470 7/1984 Japan .

Primary Examiner—Joseph L. Schofer
Assistant Examiner—Bernard Lipman

Attorney, Agent, or Firm—Thomas M. Breininger

[57] ABSTRACT

Disclosed is an ungelled acrylic resin composition containing an acrylic polymer having in a molecule thereof at least one group containing a silicon atom selected from:

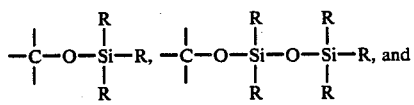

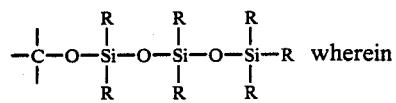

each R independently is selected from the group of moieties consisting of Y, hydrogen, a $C_1$-$C_{10}$ group joined to Si through an Si—C linkage, and $OR^7$ in which $R^7$ represents alkyl having at least 4 carbon atoms, aryl, alkylaryl, arylaklyl, aryloxyalkyl, or alkyloxyalkyl, wherein Y represents an easily hydrolyzable group.

The acrylic resin composition, contains an amount of easily hydrolyzable Y moieties such that the ratio of the number of grams of the ungelled acrylic resin composition to equivalent of easily hydrolyzable Y moieties in the ungelled acrylic resin composition is in a range of from 40 to 667. Prefered acrylic resin compositions of the invention can be cured in the presence of atmospheric moisture and a suitable catalyst at a temperature of less than or equal to 121 degrees Celsius within 3 hours.

Disclosed is a method for producing the ungelled acrylic resin composition.

Also disclosed is a nonaqueous composition, particularly a nonaqueous coating composition, containing the ungelled acrylic resin composition. Preferred coating compositions containing an ungelled acrylic resin composition can be cured in the presence of atmospheric moisture and a suitable catalyst at a temperature of less than or equal to 121 degrees C within 3 hours.

2 Claims, No Drawings

SUBSTRATES COATED WITH NONAQUEOUS COMPOSITIONS COMPRISING ACRYLIC POLYMERS CONTAINING HYDROLYZABLE MOIETIES FROM ORGANOSILANE COMPOUNDS

This is a division of application Ser. No. 728,973, filed Apr. 30, 1985, now U.S. Pat. No. 4,714,738.

BACKGROUND OF THE INVENTION

1. Field of Invention

This invention is directed to a curable, acrylic polymer and to a composition, particularly a coating composition, containing an acrylic polymer which composition cures at low temperature, preferably ambient temperature, in the presence of moisture. 2. Description of Prior Art U.S. Pat. No. 4,368,294 describes organopolysiloxane modified organic polymers prepared by reacting, in the presence of water in excess of any formad during the reaction, organic polymers containing C-bonded hydroxyl groups with organopolysiloxanes containing Si-bonded hydroxyl groups and/or alkyl groups which are bonded to silicon via oxygen. However, the polymers disclosed therein, as can be seen from the examples, are essentialy polymers which are cured by conventional means such as heat curing of C—OH groups on the polymers using a C—OH reactive crosslinking agent.

U.S. Pat. No. 4,339,261 describes a curable composition containing a blend of (a) a silyl-group containing vinyl resin which has a main chain consisting essentially of vinyl polymer and has in one molecule at least one silicon atom connected to a hydrolyzable group on the terminal or side chain; (B) a iin compound; and (C) an amine having in one molecule at least one silicon atom connected to a hydrolyzable group. Column 2, lines 6–20 discloses that the vinyl resin (A) contains a main chain consisting essentially of one or more hydrolyzable silyl groups attached to its terminal or side chains. It is specifically disclosed that the silyl group is represented by a specified formula (I) in which the silicon atom of the silyl group containing the hydrolyzable group is bound to the vinyl resin through a carbon linkage. Two methods are disclosed for preparing the silyl group containing vinyl resin of the patent.

The first involves the reaction of a hydrosilane with a vinyl resin having carbon-carbon double bonds in the presence of a complex of a Group VIII transition metal. The preparation of such silyl group containing resins by this first method is also described in U.S. Pat No. 4,191,713. The second method described in U.S. Pat No. 4,399,261 is for preparing the silyl group containing vinyl resin involves free radical copolymerization of a vinyl compound with a silane compound of specified formula having a polymerizable double bond therein, an example of the silane compound being gamma-methacryloxypropyltrimethoxysilane. However, the methods for preparing the silyl group containing vinyl resins, and hence the resins themselves, tend to be costly which thereby tends to effectively limit their utility. For example, compounds such as functional organosilane like gamma-methacrylatopropyl trimethoxy silane as well as platinum catalysts are costly. Moreover, compositions based on such resins often do not cure as well as is desirable for a number of purposes, and typically contain lower total solids contents than is desirable for a number of purposes. Additionally it is difficult to prepare in a reproducible manner such resins from monomers which contain active hydrogen atoms such as hydroxyl groups so as to obtain resins having relatively uniform properties.

3. Some Objects of the Present Invention

There is a continuing need, particularly in the coatings industry, to provide compositions which have low curing temperatures and, preferably, which cure at ambient temperature. There is also a continuing need to provide compositions which contain ever lower concentrations of volatile organic components. Additionally, it would be desirable to provide compositions which do not depend on organic isocyanates for curing.

However, previous approaches to meet these challenges generally have involved disadvantageous compromises among desirable coating composition properties such as molecular weight of the principal film forming resin, application viscosity of the composition, low curing temperature, and desirable properties of the cured film such as water resistance, flexibility, hardness, solvent resistance, etc.

Objects of the present invention are to help meet these challenges. Additionally, an object of the present invention is to prepare new curing agents for organic polyols. Other objects of the invention will become apparent to the reader infra.

SUMMARY OF THE INVENTION

The present invention is for an ungelled acrylic resin composition containing an acrylic polymer having in a molecule thereof at least one group containing a silicon atom, the aforesaid group being independently selected from:

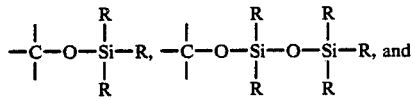

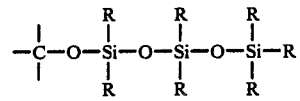

wherein each R, which may the same or different, represents: Y; hydrogen; a $C_1$-$C_{10}$ group joined to Si through an Si—C linkage optionally containing a primary amino group, a secondary amino group, a tertiary amino group, a polyamino group, a mercapto group, a methacrylato group, an acrylato group, a urea group, a cyclic urea group, a urethane group, a 1,2-epoxy group, an ester group, an ether group, a thiocther group, an amido group, an imidazolinyl group, a cyano group, an allyl group, a vinyl group, and/or a halo group; or a $OR^7$ group in which $R^7$ represents alkyl having at least 4 carbon atoms, aryl, alkylaryl, arylalkyl, aryloxyalkyl, or alkyloxyalkyl; wherein Y represents an easily hydrolyzable group; provided that the acrylic resin composition, contains an amount of easily hydrolyzable Y moieties such that the ratio of the number of grams of said ungelled acrylic resin composition to equivalents of easily hydrolyzable Y moieties in the ungelled acrylic resin composition is in a range of from 40 to 667.

In other words an ungelled acrylic resin composition of the invention has a content of Y moieties of from 25 milliequivalents per gram to 1.5 milliequivalents per gram of ungelled acrylic resin composition. Preferred acrylic resin compositions of the invention can be cured in the presence of atmospheric moisture and a suitable catalyst at a temperature of less than or equal to 250 degrees Fahrenheit (° F, 121 degrees Celsius, ° C.) within 3 hours.

The present invention also is directed to methods for producing ungelled acrylic resin compositions of the invention.

Additionally, the present invention is for a nonaqueous composition, particularly a nonaqueous coating composition containing an ungelled acrylic resin composition of the invention. Preferred coating compositions containing an ungelled acrylic resin composition of the invention can be cured in the presence of atmospheric moisture and a suitable catalyst at a temperature of less than or equal to 250 degrees F. (121 degrees C.) within 3 hours.

DETAILED DESCRIPTION OF THE INVENTION

An acrylic resin composition of the present invention is ungelled and contains an acrylic polymer having in a molecule thereof at least one group containing a silicon atom which group is selected from:

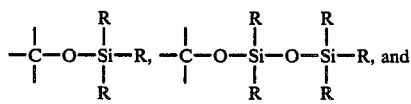
(I)    (II)

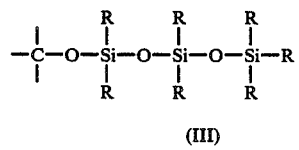
(III)

wherein each R, which may be the same or different, represents: Y; hydrogen; a $C_1$-$C_{10}$ group joined to Si through an Si-C linkage optionally containing a primary amino group, a secondary amino group, a tertiary amino group, a polyamino group, a mercapto group, a methacrylato group, an acrylato group, a urea group, a cyclic urea group, a urethane group, a 1,2-epoxy group, an ester group, an ether group, a thioether group, an amido group, an imidazolinyl group, a cyano group, an allyl group, a vinyl group, and/or a halo group; or a $OR^7$ group in which $R^7$ represents alkyl having at least 4 carbon atoms, aryl, alkylaryl, arylalkyl, aryloxyalkyl, or alkyloxyalkyl; wherein Y represents an easily hydrolyzable group; provided that the acrylic resin composition, contains an amount of easily hydrolyzable Y moieties directly bonded to silicon atoms such that the ratio of the number of grams of said ungelled acrylic resin composition to equivalents of easily hydrolyzable Y moieties in the ungelled acrylic resin composition is in the range of from 40 to 667, preferably in a range of from 40 to 400, and more preferably in a range of from 40 to 200. In other words, an ungelled acrylic resin composition of the invention has a total content of Y moieties of from 25 milliequivalents to 1.5 milliequivalents, preferably of from 25 to 2.5 milliequivalents, more preferably of from 25 to 5.0 milliequivalents, per gram of ungelled acrylic resin composition.

In the aforesaid definition of R, it is to be understood that the $C_1$-$C_{10}$ group joined to Si through an Si—C linkage can be saturated or can contain aromatic and/or ethylenic unsaturation. It is preferred that for the moieties R, which are not Y, that not all of these moieties are phenyl.

As used herein, the term "ungelled" as applied to an acrylic resin composition of the invention is understood to mean that the acrylic resin composition is itself liquid at 25 degrees C. or is capable of being liquefied in the presence of a suitable solvent at 25 degrees C. Preferred ungelled acrylic resin compositions of the invention are those which are liquid at 25 degrees C. in the presence of suitable solvents.

Acrylic resin compositions of the invention can be cured to a tack free state in the presence of atmospheric moisture and a suitable catalyst at a temperature of less than or equal to 121 degrees C. within 3 hours. Preferred acrylic resin compositions of the invention can be cured to a tack free state in the presence of atmospheric moisture and a suitable catalyst at a temperature of 25 degrees C. within 24 hours. By "tack free" is meant that a film of the cured acrylic resin composition having a thickness of about 1 mil (about 25 microns) will not feel sticky to the touch when pressed with a finger.

Examples of groups which can represent the easily hydrolyzable group Y include $-OR^1$,

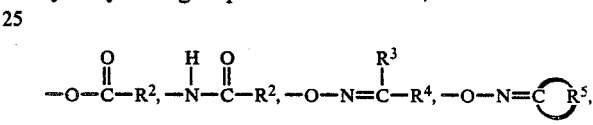

and the monohydroxy cyclic $C_2$-$C_3$ residue of a 1,2- or 1,3-glycol, wherein $R^1$ represents $C_1$-$C_3$ alkyl, preferably $C_1$-$C_2$ alkyl, and most preferably methyl, $R^2$ independently represents H or $C_1$-$C_4$ alkyl, $R^3$ and $R^4$ independently represent H, $C_1$-$C_4$ alkyl, $C_6$-$C_8$ aryl and $R^5$ represents $C_4$-$C_7$ alkylene.

Of the above examples of easily hydrolyzable groups Y, the groups

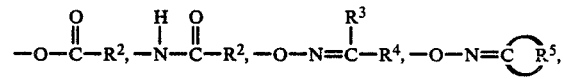

and the monohydroxy and/or cyclic $C_2$-$C_3$ residue of a 1,2- or 1,3-glycol as defined above, are less preferred than the hydrolyzable group $-OR^1$ as defined above, the groups

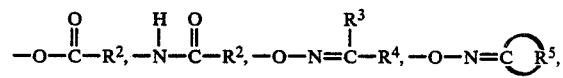

being much less preferred since they contribute to higher weight loss than desired for some applications when acrylic polymers of the invention containing these groups are cured; and their products upon cure tend to have lower vapor pressures than desired for some applications which may increase the curing times and/or temperatures of acrylic polymers of the invention containing these groups. Thus, these groups are less preferable than the aforesaid $-OR^1$ groups, particularly methoxy and ethoxy, where short curing time, low weight loss and low curing temperatures are an important consideration.

In one preferred ungelled acrylic resin composition at least one R represents —OR$^1$ wherein R$^1$ is a C$_1$–C$_{10}$ alkyl group. In one, more preferred ungelled acrylic resin composition at least one R is a methoxy group and at least one R is methyl.

An ungelled acrylic resin composition of the invention can be prepared, for example, by reacting a hydroxyl-functional acrylic resin with (a) an organosilicon-containing material containing at least 10 percent by weight of the organosilicon-containing material of a compound corresponding to the formula (VIII), R-Si(OR$^6$) wherein R is as defined for formulas (I) through (III) above, and R$^6$ independently represents a C$_1$–C$_3$ alkyl group, preferably at least one OR$^6$ group being methoxy; (b) an organosilicon-containing material comprising at least 10 percent by weight of said organosilicon-containing material of a compound corresponding to the formula

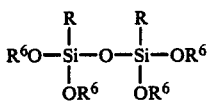
(IX)

wherein
R is as defined for formulas (I) through (III) above, and R$^6$ independently represents a C$_1$–C$_3$ alkyl group, preferably at least one OR$^6$ group being methoxy; (c) an organosilicon-containing material comprising at least 10 percent by weight of said organosilicon-containing material of a compound corresponding to the formula

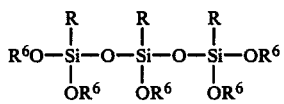
(IX)

wherein R is as defined for formulas (I) through (III) above, and R$^6$ independently represents a C$_1$–C$_3$ alkyl group, preferably at least one OR$^6$ group being methoxy; (d) an organosilicon-containing material comprising a mixture containing at least 10 percent by weight of said organosilicon-containing material of a compound corresponding to the formula R-Si(OR$^6$)$_3$ and at least 10 percent by weight of said organosilicon-containing material of a compound corresponding to the formula

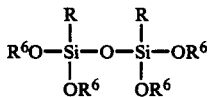
(IX)

wherein R is as defined for formulas (I) through (III) above, and R$^6$ independently represents a C$_1$–C$_3$ alkyl group, preferably at least one OR$^6$ group being methoxyl or (e) a partial hydrolysis product of a compound corresponding to the formula R-Si(OR$^6$)$_3$ wherein R is as defined for formulas (I) through (III) above, and R$^6$ independently represents a C$_1$–C$_3$ alkyl group, preferably at lest one OR$^6$ group being methoxy, and/or a combination thereof.

Examples of suitable organosilicon-containing materials for preparation of an ungelled acrylic resin composition of the invention include but are not limited to the following (1) through (4). (1) Suitable organosilicon-containing materials include organosilicates, including partial hydrolysis products thereof, such as organosilicates corresponding to the following formula (IV),

wherein R$^6$ represents methyl, ethyl or propyl (thus OR$^6$ is a "lower alkoxy moiety") R$^7$ represents alkyl containing at least 4 carbon atoms, aryl, alkylaryl, arylalkyl, aryloxyalkyl, or alkyloxyalkyl, and x is an integer ranging from 0 to 2, preferably 0 or 1, and most preferably 0.

Examples of useful organosilicates including: tetramethoxysilane, tetraethoxysilane, tetra-n-propoxysilane, methoxytriethoxysilane, dimethoxydiethoxysilane, trimethoxy-n-propoxysilane, bis(2-ethylhexoxy)diethoxysilane and the like. Mixtures of organosilicates also may be employed.

Of the organosilicates corresponding to the formula (IV), above, the tetra alkoxysilanes wherein x equals 0 in formula (IV) are preferred. The tetraalkoxysilanes provide a high degree of functionality to the acrylic resin compositions of the invention and enhance the ease with which the compositions of the invention can be cured. Additionally, the tetraalkoxysilanes are readily available at low cost. Furthermore, they can be used to attach modifying groups such as those represented by —OR$^7$ in formula (IV) above, an example of which is a sec-butoxy group. Of the examples of organosilicates described above, tetramethoxysilane is desirable for some purposes because of the ease with which it reacts with the hydroxyl moiety of a hydroxyl-functional acrylic resin. Tetraethoxysilane is also desirable since, although tetraethoxysilane is not as reactive as tetramethoxysilane, it is not as highly volatile as tetramethoxysilane.

Examples of organosilicates, other than the above organosilicates, which may be utilized in the invention include tetra acetoxysilane, diethoxydiacetoxysilane, and

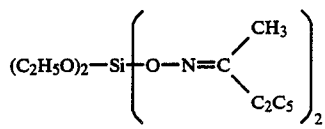

As stated previously the partial hydrolysis products of the organosilicates can be used as organosilicon-containing material for preparation of an ungelled acrylic resin composition of the invention. Hydrolyzed organosilicates provide increased reactive groups per molecule in the acrylic polymers. Additionally, the hydrolyzed organosilicates can help provide low volatility to the acrylic resin compositions of the invention.

In preparing a partial hydrolysis product, for example, from an organosilicate of formula (IV) above, a controlled amount of water is employed. Typically the hydrolysis product will be prepared utilizing a ratio of moles of the organosilicate to moles of water ranging from 1:0.75 to 1:0.4. A useful guide for determining the amount of water for preparing preferred partial hydrolysis products, where desired from organosilicates, can be found in formula (XI) infra. The amount of unhydrolyzed organosilicate compound in the partial hydrolysis product typically is less than 50 percent by weight of the organosilicate compound based on the total weight of starting organosilicate compound. Moreover, the partial hydrolysis product typically will contain greater than 5.0, and usually greater than 8.0, milliequivalents of residual easily hydrolyzable groups per gram of the partial hydrolysis product.

Where desired, organosilicates and/or partial hydrolysis products thereof containing higher alkoxy, aryloxy, arylalkyloxy, alkylaryloxy, alkyloxyalkyloxy, and/or aryloxyalkyloxy moieties attached to one or more silicon atoms in addition to the easily hydrolyzable moieties may be employed for preparation of the acrylic resin compositions of the invention. The term 'higher alkoxy' is intended to mean an alkoxy group having at least 4 carbon atoms such as sec-butoxy, n-pentoxy, isopentoxy, neopentoxy, hexoxy, nonoxy, isodecyloxy and the like. Examples of aryloxy, arylalkyloxy, alkylaryloxy, alkyloxyalkyloxy and/or aryloxyalkyloxy moieties include phenoxy, benzyloxy, phenylethoxy, tolyloxy, xylyloxy, 4-ethylphenoxy, phenoxyethoxy, 2-butoxyethoxy and the like. It is believed that the presence of such higher alkoxy, aryloxy, arylalkyloxy, alkylaryloxy, alkyloxyalkyloxy and/or aryloxyalkyloxy moieties from the organosilicon-containing material provides enhanced hydrolytic stability to acrylic resin compositions of the invention and enhanced hydrolytic stability to cured films prepared from the acrylic resin compositions of the invention when prepared, for example, using such organosilicates as the sole organosilicon-containing material. However, when an ungelled acrylic resin composition of the invention is prepared from an organosilicate (and/or partially hydrolyzed organosilicate) containing higher alkoxy, aryloxy, arylalkyloxy, alkylaryloxy, alkyloxyalkyloxy, and/or aryloxyalkyloxy moieties, the acrylic resin composition should contain a residual amount of the easily hydrolyzable moieties from the organosilicon-containing material. Moreover, the presence of such $OR^7$ type groups in an ungelled acrylic resin composition of the invention, can contribute to a slower rate of cure which may be desired for some applications. When an organosilicate is the organosilicon-containing material, the product acrylic resin composition generally will contain from 25 to 1.5 milliequivalents per gram of the acrylic resin composition of the lower alkoxy moieties $-OR^6$.

(2) Suitable organosilicon-containing materials include nonfunctional organosilanes, including partial hydrolysis products thereof. As used herein, a nonfunctional organosilane is understood to mean a material corresponding to the formula, (IV),

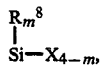
(VI)

wherein
R[8] represents hydrogen, alkyl, aryl, alkylaryl, arylalkyl, or aryloxyalkyl;
X represents $-OR^1$

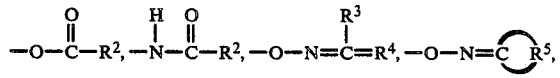

and the monohydroxy and/or cyclic $C_2-C_3$ residue of a 1,2- or 1,3-glycol, wherein R[1] represents $C_1-C_3$ alkyl, preferably $C_1-C_2$ alkyl, and most preferably methyl,
R[2] independently represent H or $C_1-C_4$ alkyl,
R[3] and R[4] independently represent H, $C_1-C_4$ alkyl, $C_6-C_8$ aryl and
R[5] represents $C_4-C_7$ alkylene, and
m is an integer ranging from 1 to 2, preferably 1.

It should be understood that the term "nonfunctional organosilane" wherever appearing herein is used for convenience to distinguish compounds corresponding to the above formula, (VI) (and/or partial hydrolysis products thereof) from those compounds (and/or partial hydrolysis products thereof) referred to herein for convenience as functional organosilanes and corresponding to the formula (VII) infra. Thus, although moieties defined by X in formula (VI) are easily displaceable by reaction with water and/or alcohol and are therefore necessarily rather reactive, they are not defined herein as "functional" as this word is used in connection with the definition of a "functional organosilane" infra.

Partial hydrolysis products of nonfunctional organosilanes can be prepared in a manner similar to the preparation of partial hydrolysis products of organosilicates discussed above. In the preparation of a partial hydrolysis product of a nonfunctional organosilane a controlled amount of water is employed. Typically the hydrolysis product will be prepared utilizing a ratio of moles of the nonfunctional organosilane to moles of water ranging from 1:0.75 to 1:0.4. A useful guide for determining the amount of water for preparing preferred partial hydrolysis products, where desired from nonfunctional organosilanes, can be found in formula (XI) infra. The amount of unhydrolyzed nonfunctional organosilane in the partial hydrolysis product typically is less than 50 percent by weight of the nonfunctional organosilane compound based on the total weight of starting nonfunctional organosilane compound. Moreover, the partial hydrolysis product typically will contain greater than 5.0, and usually greater than 8.0, milliequivalents of residual easily hydrolyzable groups per gram of the partial hydrolysis product.

Typically, when a nonfunctional organosilane (and/or a partial hydrolysis product thereof) is utilized as organosilicon-containing material, a nonfunctional organosilane corresponding to formula (VI) in which X corresponds to $-OR^1$ as defined above is employed.

Examples of nonfunctional organosilanes corresponding to the above formula, (VI), include methyl trimethoxy silane (e.g., available from Union Carbide Corporation as A-163), dimethyl dimethoxy silane, methyl triethoxy silane, dimethyl diethoxy silane, dimethoxy diphenyl silane, dimethoxy methyl phenyl silane, diethoxy dipropyl silane, dimethoxy dipropyl silane, and the like. Additional examples of the nonfunctional organosilanes include amyl triethoxy silane and triethoxy silane. Compounds such as trimethyl methoxy silane, trimethyl ethoxy silane, and ethoxy tripropyl silane may be employed where desired in limited, controlled amounts for modification purposes.

The nonfunctional organosilanes (and/or partial hydrolysis products thereof) contribute to water resistance, toughness, and stain resistance of cured films prepared from compositions containing acrylic resin compositions of the invention incorporating these nonfunctional organosilanes (and/or partial hydrolysis products thereof). Trialkoxysilanes corresponding to formula (VI) above (i.e., m equals 1 and X represents —OR¹) are preferred, those in which R⁸ represents hydrogen, methyl and —OR¹ represents methoxy being most preferred. Moreover, the dimethyl dialkoxy silanes corresponding to formula (VI) above are less desirable than the trialkoxy silanes since it is believed that the dimethyl dialkoxy silanes tend to decrease the adhesion to the substrate of cured films prepared from compositions of the inventions incorporating the dimethyl dialkoxy silanes.

As stated above, trialkoxy silanes corresponding to formula (VI) such as methyl trimethoxy silane (and/or partial hydrolysis products thereof) are especially preferred as organosilicon-containing material. Phenyl trialkoxy silane or trialkoxy silanes wherein —R⁸ in formula (VI) is represented by an aliphatic group containing more than about 10 carbon atoms are less desirable than methyl trimethoxy silane since they tend to decrease the ease of curing of acrylic resins of the invention and compositions of the invention containing such acrylic resin compositions. However, phenyl trialkoxy silanes often help the weatherability of films when properly cured, for example at temperatures above about 250 degrees F. (about 121 degrees C.) in the presence of catalyst.

Where desired, a nonfunctional organosilane (and/or partial hydrolysis products thereof) containing higher alkoxy, aryloxy, alkylaryloxy, arylalkyloxy, alkyloxyalkyloxy, and/or aryloxyalkyloxy moieties as defined previously may be used as organosilicon-containing material. Organosilicon-containing materials containing such moieties may be prepared, for example, by reacting a nonfunctional organosilane such as methyl trimethoxy silane (and/or a partial hydrolysis product thereof) with a suitable monohydric alcoholic or monohydric phenolic material so as to provide higher alkoxy, aryloxy, alkylaryloxy, arylalkyloxy, akyloxyalkyloxy, and/or aryloxyalkyloxy moieties to the nonfunctional organosilane. Examples of such organosilanes include: pentoxydimethoxymethylsilane, isopentoxydimethoxymethylsilane, 2-ethylhexoxydimethoxymethylsilane, 2-butoxyethoxydimethoxymethylsilane, diisodecyloxymethoxymethylsilane, phenoxydimethoxyphenylsilane, tolyloxydimethoxymethylsilane, phenylethyloxydimethoxymethylsilane, and the like. However, when an acrylic resin composition of the invention is prepared from a nonfunctional organosilane (and/or partially hydrolyzed nonfunctional organosilane) containing higher alkoxy, aryloxy, arylalkyloxy, alkylaryloxy, alkyloxyalkyloxy, and/or aryloxyalkyloxy moieties, the acrylic resin composition should contain a residual amount of the easily hydrolyzable moieties from the organosilicon-containing material. Moreover, the presence of such OR⁷ type groups in an acrylic resin composition of the invention, can contribute to a slower rate of cure which may be desired for some applications.

(3) Suitable organosilicon-containing materials include functional organosilanes, including partial hydrolysis products thereof. As used herein, a "functional organosilane" is intended to include materials corresponding to the following formula, (VII), F - G - SiX₃, (VII) wherein G represents an organo group containing from 2 to 10 carbon atoms, X represents —OR¹, 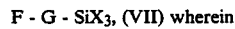

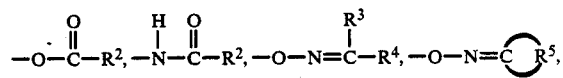

and the monohydroxy and/or cyclic C₂-C₃ residue of a 1,2- or 1,3-glycol, wherein R¹ represents C₁-C₃ alkyl, preferably C₁-C₂ alkyl, and most preferably methyl, R² independently represents H or C₁-C₄ alkyl, R³ and R⁴ independently represent H, C₁-C₄ alkyl, C₆-C₈ aryl and R⁵ represents C₄-C₇ alkylene, and F represents amino, polyamino, 1,2-epoxy, mercapto, cyano, allyl, vinyl, urethano, halo, isocyanato, ureido, imidazolinyl, acrylato, methacrylato, or a group corresponding to —SiX₃, wherein X is as defined above.

In accordance with the discussion of the distinction between nonfunctional organosilanes and functional organosilanes as these terms are used herein, groups defined by F above are considered to be the "functional" groups encompassed by the term "functional organosilane". It also should be understood that compounds such as vinyl trimethoxy silane, vinyl triethoxy silane, allyl trimethoxy silane and allyl triethoxy silane, which contain functional groups such as allyl and vinyl, while not literally corresponding to formula (VII) above, are considered herein to fall within the meaning of functional organosilane. Some examples of functional organosilanes include gamma-aminopropyltrimethoxysilane, gamma-aminopropyltriethoxysilane, beta-aminoethyltrimethoxysilane, beta-aminoethyltriethoxysilane, N-beta-aminoethylaminopropyltrimethoxysilane, gamma-isocyanatopropyltriethoxysilane, vinyl trimethoxy silane, vinyl triethoxy silane, allyl trimethoxy silane, allyl triethoxy silane, mercaptopropyltrimethoxysilane, mercaptoethyltrimethoxysilane, mercaptopropyltrimethoxysilane, glycidoxypropyltrimethoxysilane, glycidoxypropyltrimethoxysilane, 4,5-epoxycyclohexylethyltrimethoxysilane, ureidopropyltrimethoxysilane, ureidopropyltriethoxysilane, chloropropyltrimethoxysilane, chloropropyltrimethoxysilane, and

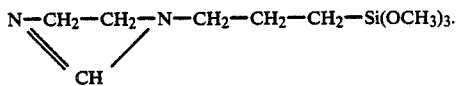

It will be appreciated that functional organosilanes containing mutually reactive functional groups such as 1,2-epoxy and amino, or amino and isocyanato, etc., or groups defined by F above which are reactive with groups defined by X above, should be employed in controlled amounts to prepare the acrylic resin compositions of the invention so as to avoid gelation or products of undesirably high viscosity.

Although the incorporation of the functional organosilanes (and/or partial hydrolysis products thereof) in the organosilicon-containing material may be desirable for some purposes, functional organosilanes tend to be costly. It has been found that, where desired, cured compositions of the invention having excellent properties can be made from acrylic resin compositions of the invention, which can be essentially self-curable in the presence of a suitable catalyst, prepared from the reaction of hydroxyl-functional acrylic resins with organosilicon-containing materials in which the amount of such functional organosilanes is minimized or even eliminated. Of course, various acrylic resin compositions of the invention prepared from functional organosilanes can be utilized, for example, as curing agents for materials containing groups reactive with the functional groups, F (see formula VII), present in such acrylic resin compositions. Moreover, for some purposes, ungelled acrylic resin compositions of the invention prepared from organosilicon-containing material containing a mixture of nonfunctional organosilane and amino-containing functional organosilane are desirable.

(4) It is to be understood that mixtures and/or partially hydrolyzed mixtures of (1) the organosilicates (and/or partial hydrolysis products thereof), and/or (2) the nonfunctional organosilanes (and/or partial hydrolysis products thereof), and/or (3) the functional organosilanes (and/or partial hydrolysis products thereof) may be employed as the organosilicon-containing material for reaction with hydroxyl-functional acrylic resins such as acrylic polyols for preparation of ungelled acrylic resin compositions of the invention.

In preparing a partial hydrolysis product, for example, from a nonfunctional organosilane of formula (VI) above, a controlled amount of water is utilized. Generally, the partial hydrolysis product will contain condensation product compounds having one or more siloxane linkages represented by the formula (V),

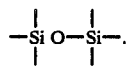
(V)

The hydrolysis and condensation reactions believed to be involved in the preparation of the ungelled partial hydrolysis products typically may be illustrated as follows:

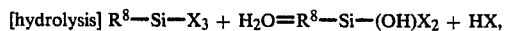

and

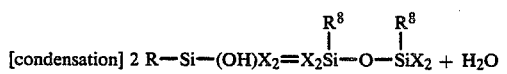

wherein $R^8$ and X are as defined in formula (VI) above, X being an easily hydrolyzable group such as, for example, methoxy or ethoxy.

In one preferred method for preparing an ungelled acrylic resin composition of the invention, a hydroxyl functional acrylic resin such as, for example, an acrylic polyol, is reacted with a partial hydrolysis product of an organosilicon-containing material containing a nonfunctional organosilane corresponding to formula (VI) above, such as methyl trimethoxy silane, optionally in combination with an organosilicate corresponding to formula (IV) above and/or a functional organosilane corresponding to formula (VII) above. The amount of water generally used for preparing the partially hydrolyzed organosilicon-containing material utilized for this preferred method can be determined according to the following formula (XI), $$(E_{1,2} \times 0.5) + (E_{3,4} \times Z) = W,$$

wherein

W represents the total moles of $H_2O$ employed calculated based on the total equivalents of the easily hydrolyzable groups from organosilane compounds such as organosilicates, nonfunctional organosilanes, and functional organosilanes, $E_{1,2}$ represents the total number of equivalents of easily hydrolyzable groups from organosilane compounds containing one or two easily hydrolyzable groups, $E_{3,4}$ represents the total number of equivalents of easily hydrolyzable groups from organosilane compounds containing three or four easily hydrolyzable groups, and Z is a number in the range of from 0.023 to 0.43, preferably in the range of from 0.050 to 0.33, and more preferably in the range of from 0.080 to 0.23.

It is to be understood that one equivalent of the hydrolyzable groups corresponds to one mole of the hydrolyzable groups, and one equivalent of water corresponds to ½ mole of water.

For example, just one useful mixture of organosilanes, suitable as organosilicon-containing material for preparation of a partial hydrolysis product, can contain methyl trimethoxy silane, phenyl trimethoxy silane, and methyl phenyl dimethoxy silane respectively in a molar ratio of 1.00 to 0.351 to 0.117. Such a mixture would provide 3.00 equivalents of methoxy groups from the methyl trimethoxy silane, 1.05 equivalents of methoxy groups from the phenyl trimethoxy silane, and 0.234 equivalents of methoxy groups from the methyl phenyl dimethoxy silane. Thus in formula (XI) above, $E_{1,2}$ would equal 0.234 and $E_{3,4}$ would equal 4.05; and assuming the maximum moles of water for preparation of the partial hydrolysis product according to formula (XI) (i.e., Z=0.43), the total moles of water for preparation of the partial hydrolysis product would equal 1.86 moles. Or, in other words, a maximum of 1.27 moles of water per mole of organosilane compound (i.e., 1.86 moles/1.468 moles equals 1.27).

Of course, it will be understood that the relative amounts of constituents in a partial hydrolysis product can be adjusted, for example by distilling off a portion, as desired, of volatile constituents from the partial hydrolysis product.

It will be appreciated from the disclosure herein, that the partial hydrolysis product prepared utilizing such a controlled amount of water as determined by formula (XI) above, will contain a mixture of low molecular weight compounds which contain residual easily hydrolyzable groups. The partial hydrolysis product typically will contain greater than 5.0, and usually greater than 8.0, milliequivalents of residual easily hydrolyzable groups per gram of partial hydrolysis product. There is also the possibility that the ungelled partial hydrolysis products prepared utilizing a controlled amount of water as determined from formula (XI) above, also contain a small amount of silanol-type ($\equiv$Si—OH) hydroxyl groups. However, such partial hydrolysis products generally will contain a ratio of residual easily hydrolyzable groups to silanol-type hydroxyl groups greater than 1.00, and typically greater than 3.00.

The partial hydrolysis of the organosilicon-containing material typically is conducted in the presence of from 0.01 to 20 percent by weight of a catalyst, which in some instances can function as a coreactant, examples of which catalyst include gamma-aminopropyl triethoxy silane, isophorone diamine, 2-amino-2-methyl-1-propanol, or the like. The percent by weight of catalyst is based on the total weight of the organosilicon-containing material. The preferred partial hydrolysis products typically contain an amount of easily hydrolyzable groups such that the ratio of the number of grams of the partial hydrolysis product to equivalents of the easily hydrolyzable groups in the partial hydrolysis product is in a range of from 40 to 300, usually in a range of from 50 to 200. In other words, the "hydrolyzable group equivalent weight" (alternatively referred to herein as "HGEW") of the partial hydrolysis product typically is in a range of from 40 to 300, usually in a range of from 50 to 200.

In one preferred embodiment of the invention, the ungelled acrylic polymer of the invention is prepared by reacting a hydroxyl-functional acrylic resin with an organosilicon-containing material comprising at least 10 percent by weight of said organosilicon-containing material of a compound corresponding to the formula IX (a disiloxane) as defined above. Such an organosilicon-containing material can be prepared, for example, by the controlled hydrolysis of a trialkoxy silane compound corresponding to formula VIII above such as methyl trimethoxy silane employing a ratio of moles of the trialkoxy silane to moles of water ranging from 1.0:0.75 to 1.0:0.1, preferably ranging from 1.0:0.6 to 1.0:0.4. Such controlled hydrolysis will produce a hydrolysis product containing a mixture of compounds. The partial hydrolysis typically is conducted in the presence of from 0.01 to 20 percent by weight of a catalyst or coreactant such as gamma-aminopropyltriethoxysilane, isophorone diamine, 2,2,4-trimethyl-hexamethylene-1,6-diamine, or 2-amino-2-methyl-1-propanol. A preferred hydrolysis product produced from such controlled hydrolysis typically will contain at least 10 percent by weight of the disiloxane (see formula IX) in combination with at least 10 percent by weight of the starting compound (see formula VIII) in addition to other compounds such as the trisiloxane (see formula X).

In a second preferred embodiment of the invention, the ungelled acrylic polymer of the invention is prepared by reacting a hydroxyl-functional acrylic resin with an organosilicon-containing material comprising the partial hydrolysis product of a mixture containing from 1 to 10 moles of methyl trimethoxy silane, from 10 to 1 moles of methyl phenyl dimethoxy silane and from 10 to 1 moles of phenyl trimethoxy silane. The partial hydrolysis typically is conducted in the presence of a catalyst or coreactant such as gamma-aminopropyltriethoxysilane, isophorone diamine, 2,2,4-trimethylhexamethylene-1,6-diamine or 2-amino-2-methyl-1-propanol. The partial hydrolysis is conducted employing a controlled amount of water, for example, from 0.75 to 0.1 moles of water per mole of alkoxy silane groups. It has been found that often such partial hydrolysis products of methyl trimethoxy silane, methyl phenyl dimethoxy silane, and phenyl trimethoxy silane are more compatible with hydroxyl-functional acrylic resins than the partial hydrolysis product of methyl trimethoxy silane alone. Sometimes an alcohol such as methanol or ethanol is needed to render the partial hydrolysis product homogeneous.

As described above, an acrylic resin composition of the invention can be prepared, for example, by reacting a hydroxyl functional acrylic resin with organosilicon-containing materials as described above. Typically the hydroxyl-functional acrylic resin comprises an acrylic polyol.

Acrylic polyols include but are not limited to the known hydroxyl-functional addition polymers and copolymers of acrylic and methacrylic acids and their ester derivatives including but not limited to their hydroxyl functional ester derivatives, acrylamide and methacrylamide, and unsaturated nitriles such as acrylonitrile and methacrylonitrile. Additional examples of acrylic monomers which can be addition polymerized to form acrylic polyols include hydroxyethyl (meth)acrylate, hydroxypropyl (meth)acrylate, methyl (meth)acrylate, ethyl (meth)acrylate, propyl (meth)acrylate, isopropyl (meth)acrylate, butyl (meth)acrylate, t-butyl (meth)acrylate, 2-ethylhexyl (meth)acrylate, n-hexyl (meth)acrylate, cyclohexyl (meth)acrylate, 3,3,5-trimethylcyclohexyl (meth)acrylate, decyl (meth)acrylate, isodecyl (meth)acrylate, lauryl (meth)acrylate, stearyl (meth)acrylate, phenyl (meth)acrylate, and isobornyl (meth)acrylate.

Additional examples of compounds which may be employed in the preparation of hydroxyl-functional acrylic resins, or as the hydroxyl-functional acrylic resins, for reaction with organosilicon-containing material include: compounds produced by the reaction of lactones such as caprolactone with hydroxyl functional acrylic esters such as hydroxy ethyl acrylate and hydroxy propyl acrylate; epoxy-esters produced by the reaction of fatty acids, especially monocarboxylic fatty acids, with ethylenically unsaturated epoxides such as glycidyl acrylate and glycidyl monomers such as those described previously herein with ethylenically unsaturated anhydride such as maleic anhydride in which the anhydride rings are reacted with a polyol such as a low molecular weight diol.

Where desired, various other unsaturated monomers can be employed in the preparation of hydroxyl-functional acrylic resins such as acrylic polyols, examples of which include: vinyl aromatic hydrocarbons such as styrene, alpha-methyl styrene, and vinyl toluene; vinyl acetate; vinyl chloride; and unsaturated epoxy functional monomers such as glycidyl (meth)acrylate. For convenience, the term "(meth)acrylate" has been used herein to denote either or both of the respective acrylate compound and the respective methacrylate compound. Suitable acrylic polyols for preparation of ungelled acrylic resin compositions by gel permeation chromatography using a polystyrene standard of from 600 to 50,000. Moreover, suitable acrylic polyols for preparation of the acrylic polymers of the invention have a hydroxyl equivalent weight of from 116 to 1,000.

The above examples of hydroxyl-functional acrylic resins should be considered to be merely illustrative or hydroxyl-functional acrylic resins which may be utilized for preparation of ungelled acrylic resin compositions of the invention.

When an ungelled acrylic polymer of the invention is prepared by reaction of an acrylic polyol and an organosilicon-containing material as described above, the acrylic polyol and the organosilicon-containing material are reacted typically under a blanket of a nonreactive gas such as nitrogen at a temperature ranging from about 50 degrees C. to about 180 degrees C. for 0.5 to 50 hours usually with removal by distillation of the low boiling volatile reaction product such as the volatile alcohol. If distillate is removed, a fractionating column may be used as a precaution to prevent removal of the starting materials. Depending on the vapor pressures of the starting materials, for example, where materials having high vapor pressures are employed, often the reaction is conducted under pressure.

Often the starting materials do not form a homogeneous mixture at ambient temperature to being with; however, as the reaction is carried out the materials usually form a homogeneous mixture as the reaction proceeds. Moreover, materials such as gamma-glycidoxypropyl trimethoxy silane, QP8-5314 (a mixture believed to contain 25 mole percent methylphenyldimethoxysilane and 75 mole percent phenyltrimethoxysilane available from Dow Corning), and n-methylpyrrolidone can be utilized in the reaction mixture to aid in rendering the starting materials compatible.

Depending on the choice of reactants and optionally catalysts, the reaction may be conducted under milder or more severe conditions of time and temperature. For example, the reaction may be conducted at a temperature such as 80 degrees C. for about 1 hour with removal of alcohol. Or where the reaction is carried out without a catalyst, the reaction may be conducted for example at 175 degrees C. for 3 or more hours. The presence of a catalytic amount of catalyst such as stannous octoate facilitates removal of volatile alcohol. Typically, a solvent is not included in the reaction medium. However, a limited amount of solvent may be desired particularly where the product is to be used as essentially the only film forming component in a coating composition or where the product is to be used in a high solids coating composition.

Ungelled acrylic resin compositions of the invention are suitable for utilization in low solids and high solids coating applications. A high solids coating composition as defined herein typically contains at least 50 percent, preferably at least 60 percent, and most preferably at least 70 percent, by weight resin solids based on the weight of that portion of the composition including the reaction product (i.e., acrylic resin composition) and organic solvent but excluding the weight of pigments, fillers and the like which may be present in the coating composition. However, where desired, solvents which are compatible with the reactants can be employed. Moreover, the product may be thinned with solvent. Examples of such solvents include conventional ketones such as methyl ethyl ketone, hydrocarbons such as xylene and toluene, the mono- and dialkylethers of di-ethylene glycol such as diethylene glycol dibutyl ether and diethylene glycol diethyl ether and low molecular weight alcohols such as methanol and ethanol. Moreover, it has been found that low molecular weight alcohols such as methanol and ethanol can be utilized to enhance the stability of ungelled acrylic resin compositions of the invention. When desired, a limited amount of water can be employed to hydrolyze an unhydrolyzed organosilicon-containing material prior to, during, or even after reaction of the organosilicon-containing material with the hydroxyl-functional acrylic resin.

Where water is employed in the reaction mixture, the amount of water must be controlled because water is a reactant in the reaction mixture. Moreover, when water is present as a separate phase, a water soluble solvent is often used to make the mixture homogeneous. Additionally, a moisture-free atmosphere usually is employed because uncontrolled hydrolysis of the organosilicon-containing material during product preparation is not desired and also in order to minimize the water content in the ungelled acrylic resin product.

Depending on the particular choice of reactants, the reaction between the organosilicon-containing material and hydroxyl-functional acrylic resin may be sluggish, and where desired, a catalyst may be utilized to speed up the reaction. Examples of such catalysts include: acids such as paratoluenesulfonic acid; tin-containing compounds such as butylstannoic acid, dibutyl tin oxide, stannous octoate and dibutyl tin dilaurate; titanates such as tetraisopropyltitanate and tetrabutyltitanate; amino compounds such as aminopropyltriethoxysilane, isopropanol amine, 2-amino-2-methyl-1-propanol, isophorone amine, 2-amino-2-methyl-1-propanol, isophoro diamine, 2,2,4-trimethyl hexamethylene diamine, and the like. Of course, where functional organosilanes as described previously herein are employed for organosilicon-containing material, the choice of catalyst will be in part governed by the functional groups present so as to avoid gelation. Moreover, the extent of reaction should be controlled so as to avoid gelation. The extent of reaction can be monitored by following the amount of product HY given off during the reaction. When catalysts are utilized in the preparation of the acrylic resin compositions of the invention, reaction temperatures lower than about 120 degrees C. are feasible.

When an ungelled acrylic resin composition of the invention is prepared from the reaction of an organosilicon-containing material as described above and a hydroxyl-functional acrylic resin such as an acrylic polyol, the amounts by weight of the organosilicon-containing material and the hydroxyl-functional acrylic resin for preparation of the ungelled acrylic resin composition may vary. Depending on the particular choice of hydroxyl-functional acrylic resin and organosilicon-containing material, the mole ratio of hydroxyl moieties (i.e., C—OH) from the hydroxyl-functional acrylic resin to hydroxyl-reactive Y moieties, for example such as lower alkoxy moieties, from the organosilicon-containing material may vary. However, an amount of hydroxyl-functional acrylic resin and an amount of organosilicon-containing material generally will be chosen and the extent of reaction controlled such that the ungelled acrylic resin composition will contain an amount of the Y moieties such that the ratio of the number of grams of ungelled acrylic resin composition to equivalents of the Y moieties in the ungelled acrylic resin composition is in a range of from 40 to 667, preferably in a range of from 40 to 400, and more preferably in a range of from 40 to 200. A useful guide is to choose the hydroxyl-functional acrylic resin and organosilicon-containing starting materials so as to provide a ratio of equivalents of hydroxyl moieties from the hydroxyl-functional acrylic resin to equivalents of hydroxyl-reactive Y moieties, such as lower alkoxy moieties, from the organosilicon-containing material ranging from 1:2 to 1:100. Typically a ratio of equivalents of 1:3 to 1:20 is employed. It will be understood that 1 equivalent of hydroxyl moieties equals 1 mole of hydroxyl moieties and 1 equivalent of the reactive Y moieties equals 1 mole of the hydroxyl-reactive Y moieties. An ungelled acrylic resin composition of the invention will contain a total content of Y moieties of from 25 to 1.5 milliequivalents, preferably of from 25 to 2.5 milliequivalent, more preferably of from 25 to 5.0 milliequivalents, per gram of ungelled acrylic resin composition. Moreover, typically the content of hydroxyl moieties (i.e., C-OH) in the ungelled acrylic resin reaction product from the hydroxyl-functional acrylic resin will range from 0 milliequivalents to 10 milliequivalents per gram of reaction product, usually from 0 to 5 milliequivalents per gram of reaction product. As used herein, one milliequivalent of either the hydroxyl moiety (i.e, C—OH) or the moiety Y bonded to Si is equal to one millimole.

Most of the ungelled acrylic resin compositions of the invention are storage stable for periods of at least 3 months, preferably for one year in airtight containers so as to prevent the introduction of moisture into the composition containing the ungelled acrylic resin composition. Where desired, they may be stored under dry nitrogen. Also, product compatible materials which easily hydrolyze so as to act as scavengers for water may be combined with the composition. Examples of such easily hydrolyzable product compatible materials include organosilicates, organosilanes, or materials such as ethylorthoformate and 2,2-dimethoxy propane. Water scavenging amounts of organosilicates or organosilanes can be incorporated with the product either by combining them with the acrylic resin composition of the invention after the acrylic resin composition is prepared or by employing an excess of organosilicon-containing material during the reaction of this material with the hydroxyl-functional acrylic resin. To those that are not as stable as desired, such as some prepared using a catalyst, the ungelled acrylic resin compositions of the invention can be stabilized by using trace amounts of compounds which act as inhibitors such as boron trifluoride etherate (a 1 to 1 mole ratio of born trifluoride diethyl ether). Moreover, as discussed previously herein, low molecular weight alcohols such as methanol and ethanol can be utilized to enhance the stability of the ungelled acrylic resin compositions.

The ungelled acrylic resin compositions of the invention advantageously may be utilized, typically in the presence of a catalyst, as essentially a sole film former for coating various substrates such as metal, paper, wood, wood furniture, hardboard, plastics, glass, and the like. It has been found that acrylic resin compositions of the invention can provide coatings for wood furniture which exhibit an outstanding combination of properties compared to nitrocellulose lacquers which have long been utilized as topcoating compositions in the wood furniture industry. Moreover, it has been found that compositions based on acrylic resin compositions of the invention can provide automotive quality coatings for both original equipment manufacture and automotive refinishing applicaions which can be cured at low temperatures (less than 180 degrees F., 82.2 degrees C.). Preferred compositions based on acrylic resin compositions of the invention for automotive refinishing applications can be cured at ambient temperature (e.g., 25 degrees C.) in the presence of atmospheric moisture.

Examples of catalysts which may be used to promote the cure of compositions containing ungelled acrylic resin compositions of the invention include: salts such as tin naphthenate, tin benzoate, tin octoate, tin butyrate, dibutyltin dilaurate, dibutyltin diacetate, iron stearate and lead octoate; titanates such as tetraisopropyl titanate and tetrabutyl titanate; oxides such as dibutyltin oxide; and bases such as isophorone diamine, methylene dianiline, imidazole, gamma-aminopropyl triethoxy silane, aminoalcohols such as 2-amino-2-methyl-1-propanol and other basic nitrogen-containing compounds.

Compositions containing ungelled acrylic resin compositions of the invention can contain organic solvents, examples of which include: alcohols, such as methanol, ethanol, propanol, butanol and the like; the mono- and dialkyl ethers of ethylene and propylene glycol such as ethylene glycol monoethyl ether, ethylene glycol monobutyl ether, ethylene glycol dibutyl ether, ethylene glycol monoethyl ether acetate, ethylene glycol monohexyl ether acetate, propylene glycol monoethyl ether and propylene glycol dibutyl ether; the mono- and dialkyl ethers of diethylene glycol such as diethylene glycol monoethyl ether, diethylene glycol dibutyl ether, diethylene glycol diethyl ether and diethylene glycol monobutyl ether acetate; ketones such as methylethyl ketone; esters such as butyl-acetate; hydrocarbons such as xylene and toluene; N-methyl-2-pyrrolidone; dimethyl formamide; and mixtures thereof.

Coating compositions utilizing acrylic resin compositions of the invention may be applied to substrates using any suitable technique such as brushing, dipping, spraying, roll coating, doctor blade coating, curtain coating, etc.

Compositions based on acrylic resin compositions of the invention may be pigmented or unpigmented and may be utilized in the presence of various generally known additives such as flow control agents, surfactants, leveling agents, anti-mar agents, fungicides, mildewcides, and the like. Examples of pigments include any of the generally known pigments including extender pigments used in the coatings and resins industry such as titanium dioxide, magnesium carbonate, dolomite, talc, zinc oxide, magnesium oxide, iron oxides red and black, barium yellow, carbon black, strontium chromate, lead chromate, molybdate red, chromoxide green, cobalt blue, organic pigments of the azo series, metallic flake pigments such as aluminum flakes and nickel flakes, etc. Mixtures of pigments also may be employed.

Additionally, acrylic resin compositions of the invention can be utilized as curing agents, in addition to or in substitution for generally known curing agents, for organic polyols generally known for use in coating compositions, examples of which polyols include but are not limited to simple diols, triols, and higher hydric alcohols; acrylic polyols; polyurethane polyols; polyester polyols; polyether polyols; amide-containing polyols; polyhydroxyl-functional epoxy resins; polyhydric polyvinyl alcohols etc. Such organic polyols are generally known in the art of coatings compositions.

The ungelled acrylic resin compositions of the invention also may be utilized as additives to modify the properties of generally known coating compositions compatible with additive amounts of the acrylic resin compositions. For example, the acrylic resin compositions of the invention may be incorporated in additive amounts to modify such coating compositions properties as rheological properties such as viscosity, surface tension, flow, leveling, etc. An "additive amount" is understood herein to mean an amount of up to about 5 percent by weight based on the weight of resin solids in the coating composition (i.e., excluding pigments and solid fillers).

The ungelled acrylic resin compositions of the invention also may be utilized in adhesives, sealants, inks, etc.

The following examples illustrate the invention and are not to be construed as limiting it to their details. As used herein, "pbw" means "parts by weight". All parts and percentages in the examples and throughout the specification are by weight unless specifically indicated otherwise.

EXAMPLE 1

(a) Preparation Of A Partially Hydrolyzed Organosilane

To a flask equipped with addition funnel, reflux condenser, thermometer, heater, stirrer and nitrogen inlet is charged at room temperature (about 24 degrees C.) under a blanket of nitrogen, 25,855.0 grams (g; 190.0 moles) of methyltrimethoxysilane (obtained as A-163 from Union Carbide Corporation) and 261.4 g (1.182 moles) of gamma-aminopropyltriethoxysilane (obtained as A-1100 from Union Carbide Corporation). Next, the contents of the flask are slowly heated over a period of 30 minutes to 50 degrees Celsius (degrees C.) at which point the slow addition of deionized water to the contents of the flask is begun. While the contents of the flask are stirred, a total of 1883.0 g (104.6 moles) of deionized water is added to the contents of the flask over a period of 75 minutes while the temperature of the contents of the flask (pot temperature) is maintained in the range of from 50 to 58 degrees C. Immediately after the addition of the water is completed, the contents of the flask are heated to reflux over a period of 17 minutes at the end of which period the pot temperature is 67 degrees C. The contents of the flask are allowed to reflux over a period of about 3 hours and 8 minutes while the pot temperature is maintained in the range of from 64 to 68 degrees C. after which period heating is discontinued and the contents of the flask allowed to cool to ambient temperature. The resulting composition is a partially hydrolyzed organosilane.

(b) Preparation Of Ungelled Acrylic Polymer By Reacting Acrylic Polyol With Partially Hydrolyzed Organosilane A reaction vessel equipped with condenser, stirrer, thermometer, distillation column, and means for maintaining a nitrogen blanket is charged at ambient temperature with 4131.0 g of a hydroxyl-functional acrylic polymer[1] and 5941.0 g of the partially hydrolyzed organosilane composition of part (a) immediately above. The contents of the vessel are slowly heated to reflux during a period of 1 hour and 9 minutes at the end of which period the pot temperature is observed to be 69 degrees C., the head temperature is observed to be 51 degrees C., and about 100 milliliters (ml) of distillate has been collected. Heating is continued for a' period of 2 hours and 8 minutes while the temperature of the contents of the vessel (pot temperature) ranges between 69 and 75 degrees C. (heat temperature between 51 and 65 degrees C.) until a total of about 1600 ml of distillate (1389.5 g) has been collected at which point heating is discontinued and the contents of the vessel allowed to cool overnight to ambient temperature. Thereafter, the contents of the vessel (still equipped as above) are heated over a period of 12 minutes to a pot temperature of 73 degrees C. (heat temperature, 57 degrees C.) at which temperature distillate (containing methanol) is observed to be distilling off. Heating is continued over a period of 2 hours and 41 minutes while the contents of the vessel are refluxed and maintained in a temperarure range of from 75 to 110 degrees C. (heat temperature of from 57 to 80 degrees C.) at the end of which period heating is discontinued and the contents of the vessel allowed to cool to ambient temperature. The total weight of distillate collected is observed to be 2,467 g; and the total weight of the resulting product in the reaction vessel is observed to be 7,652 g. The resulting product composition has a viscosity of 1.8 stokes and a color value of 2. The percent by weight total solids content of a sample of the product measured at 150 degrees C. for 2 hour is 46.5 percent. The percent by weight total solids content of a sample of the product measured at 100 degrees C. for 1 hour is 50.2 percent.

[1] An acrylic polyol resin (30.0% by weight methyl methacrylate, 25.0% by weight styrene, 19.0% by weight butyl methacrylate, 12.0 percent by weight 2-ethylhexyl acrylate and 14.0% by weight hydroxyethyl acrylate) at from 58 to 60 percent by weight resin solids in a mixture of solvents (74.7% by weight butyl acetate, 15.1% by weight naphtha, and 10.2% by weight toluene) and having a Gardner-Holdt bubble tube viscosity of about X-Z+.

(c) Preparation of Ungelled Acrylic Polymer Further Modified With Adduct Of The Diglycidyl Ether of Hydrogenated Bisphenol-A With Gamma-aminopropyltriethoxysilane A reaction vessel equipped with condenser, stirrer, thermometer, dropping funnel, and means for maintaining a nitrogen blanket is charged at ambient temperature with 1090 g of the product composition of part (b) immediately above, and 70.4 g of gamma-aminopropyltriethoxysilane. The contents of the vessel are heated over a period of 20 minutes to 60 degrees C. at which point the addition of 70.4 g of the diglycidyl ether of hydrogenated bisphenol-A (obtained as DRH-1510 from Shell Chemical Company) is begun. Addition of the DRH-1510 to the contents of the vessel with stirring is continued over a period of 45 minutes while the temperature of the contents of the vessel is maintained in a range of 60 to 62 degrees C. at the end of which period the addition has been completed. Thereafter, the contents of the vessel are held for 30 minutes at 62 degrees C. after which the temperature is raised over a period of 30 minutes to 100 degrees C. and held at 100 degrees C. for 1 hour after which heating is discontinued and the contents of the vessel cooled to ambient temperature. To 805.8 g of the resulting product is added 13 g of methanol. The resulting composition has a viscosity of 1.7 stokes, a color value of 3-4, an epoxy equivalent weight of infinity, and a weight per unit volume of 8.63 pounds per gallon. The percent by weight total solids content of a sample of the product measured at 150 degrees C. for 2 hours(s) is 49.3 percent. The percent by weight total solids content of a sample of the product measured at 110 degrees C. for 1 hour(s) is 54.7 percent.

EXAMPLE 2

(a) Preparation Of A Partial Hydrolysis Product Of A Mixture Of Organosilanes A reaction vessel equipped with addition funnel, reflux condenser, thermometer, dropping funnel, heater, stirrer and nitrogen inlet is charged at room temperature with 17,371 g (127.6 moles) of methyltrimethoxysilane, 11,581 g of QP8-5314 (a mixture of 25 mole percent methylphenyldimethoxysilane and 75 mole percent phenyltrimethoxysilane providing 14.9 moles of methylphenyldimethoxysilane and 44.7 moles of phenyltrimethoxysilane; available from Dow Corning Corporation) and 145 g of 2-amino-2-methylpropanol. The contents of the vessel are heated for 47 minutes to a temperature of 48 degrees C. whereupon heating is discontinued and two minutes later the addition of deionized water to the contents of the vessel is begun. While the contents of the reaction vessel are stirred, a total of 1,695 g (94.2 moles) of deionized water is added to the vessel over a period of 1 hour and 47 minutes while the temperature of the contents of the reaction vessel ranges between 48 and 51 degrees C. Thereafter, the contents of the vessel are allowed to remain for 31 minutes at 51 degrees C. at the end of which period the contents of the vessel are heated over a period of 22 minutes to a temperature of 62 degrees C. at which temperature refluxing is observed. Thereafter the contents of the vessel are refluxed for 1 hour and 44 minutes while the pot temperature is maintained in a range of from 62 to 67 degrees C. at the end of which period refluxing is discontinued and the contents of the vessel allowed to cool to ambient temperature. The resulting composition (hereinafter referred to as composition A) is a partially hydrolyzed mixture of organosilanes.

A reaction vessel equipped as described above is charged at room temperature with 12,000 g of composition A as described above and 402 g of gamma-aminopropyltriethoxysilane (available as A-1100 from Union Carbide Corporation). The contents of the vessel are heated over a period of 50 minutes to a temperature of 65 degrees C. at which temperature heating is discontinued. The contents of the vessel cool to 64 degrees C. over a period of 7 minutes after which the addition of 402 g of the diglycidyl ether of hydrogenated bisphenol-A (obtained as DRH-1510 from Shell Chemical Company) is begun. During the next 12 minutes the temperature of the contents of the vessel drops to 60 degrees while the addition of the diglycidyl ether of hydrogenated bisphenol-A continues. Thereafter, heating is resumed while the contents of the vessel are maintained for 50 minutes in a range of from 59 to 60 degrees C. as the addition of the diglycidyl ether of hydrogenated bisphenol-A continues. At the end of the aforesaid 50 minute period, the addition of the 402 g of diglycidyl ether of hydrogenated bisphenol-A is complete. Thereafter, the contents of the vessel are maintained for 1 hour and 31 minutes at 60 degrees C. at the end of which period heating is discontinued and the contents of the vessel allowed to cool to room temperature. The resultant composition (hereinafter referred to as composition B) is a partially hydrolyzed mixture of organosilanes and functional organosilanes.

(b) Preparation Of A Hydroxyl-functional Acrylic Resin

This part illustrates the preparation of an acrylic polyol. The following monomers are used:

|  | Percent by Weight |
| --- | --- |
| 2-Ethylhexyl acrylate | 54.4 |
| Hydroxypropyl acrylate | 33.6 |
| Styrene | 10.0 |
| Methacrylic acid | 2.0 |

A 4-neck flask equipped with reflux condenser, stirrer, thermometer, 2 dropping funnels, nitrogen inlet, and water trap is charged with 515.4 g of xylene at 25 degrees C. which charge is heated under a blanket of nitrogen and agitation over a period of 20 minutes to reflux. Two charges are next made simultaneously over a period of 3 hours while maintaining the flask at reflux conditions. Charge I consists of a mixture of 1218.6 g 2-ethylhexyl acrylate, 752.6 g hydroxyproylacrylate, 224.0 g styrene and 44.8 g methacrylic acid. Charge II consists of a mixture of 231.6 g xylene and 112.0 g 2,2'-azobis-(2-methylisobutyronitrile) initiator. The contents of the flask are maintained at reflux for 2 hours after which 343.6 g of distillate containing xylene is distilled off over a period of 1 hour and 20 minutes. Thereafter heating is discontinued and 556.2 g isopropyl alcohol is added to the contents of the flask. The resultant composition (hereinafter referred to as composition C) is a hydroxyl-functional acrylic resin (acrylic polyol).

The resultant coposition has a solids content measured for 2 hours at 110 degrees C. of 67.1 percent by weight, a solids content measured for 2 hours at 150 degrees C. of 66.6 percent by weight, a viscosity of 4.80 Stokes and an acid value of 10.0. An analysis of the resultant composition shows it to have a peak molecular weight of 5,577 as determined by gel permeation chromatography using a polystyrene standard.

(c) Preparation Of Ungelled Acrylic Resin Composition By Reacting Hydroxyl-functional Acrylic Resin With Partially Hydrolyzed Mixture Of Organosilanes And Functional Organosilanes A reaction vessel equipped with condenser, stirrer, thermometer, distillation column, and means for maintaining a nitrogen blanket is charged at ambient temperature with 1682.3 g of the resultant composition A of part (a) above and 60.5 g of gamma-aminopropyl triethoxy silane. The contents of the vessel are heated to reflux during a period of 24 minutes at the end of which period of the pot temperature is observed to be 60 degrees C. whereupon the addition of the diglycidyl ether of hydrogenated bisphenol-A to the contents of the vessel is begun. The temperature of the contents of the vessel is maintained at 60 degrees C. during the addition, and the addition is complete after 21 minutes at the end of which period a total of 60.5 g of the diglycidyl ether of hydrogenated bisphenol-A has been added to the contents of the vessel. Thereafter, the contents of the vessel are allowed to reflux for 2 hours while the temperature is maintained in a range of from 60 and 75 degrees C. At the end of this period, 860.8 g of composition C (acrylic polyol) of part (b) above is added to the contents of the vessel over a period of 23 minutes while the temperature is maintained at 60 degrees C. The contents of the vessel are allowed to reflux for 1 hour and 17 minutes while the temperature ranges from 60 degrees C. to 75 degrees C. after which distillation is begun. The contents of the vessel are refluxed for 1 hour and 31 minutes while the temperature of the contents of the vessel (pot temperature) ranges between 75 and 80 degrees C. at the end of which period a total of 415 ml of distillate containing methanol has been collected whereupon heating is discontinued and the contents of the vessel allowed to cool to ambient temperature overnight. Next the contents of the vessel are heated to a temperature of 83 degrees C. (heat temperature of 64 degrees C.) at which temperature distillation is observed. The distillation is continued over a period of 4 hours and 4 minutes while the pot temperature ranges between 83 and 105 degrees C. (head temperature between 60 and 67 degrees C.) after which period heating is discontinued and the contents of the vessel allowed to cool. A total of 790 ml of distillate has been collected over the course of the entire distillation. When the contents of the vessel have cooled to 65 degrees C., about 26.6 g of methanol is added to the vessel over 4 minutes. The density of the distillate is 0.848 grams/milliliter.

The resulting product is an ungelled acrylic resin composition of the invention. The ungelled acrylic resin composition has a viscosity of 2.64 stokes, an acid value of 4.1, and a percent by weight total solids content measured at 110 degrees C. for 1 hour of 62.8 percent.

(d) Coating Composition Containing Ungelled Acrylic Resin Composition Of The Invention A coating composition is prepared by mixing 15.39 g of the ungelled acrylic resin composition of part (e) immediately above with 0.2 g of dibutyl tin dilaurate.

The coating composition is applied with a No. 60 wire wound bar to two steel panels treated with a zinc phosphate pretreatment (BONDERITE-40). The resultant coating on one of the steel panels is cured for 30 minutes at 121 degrees C. The resultant coating on the other steel panel is cured at ambient temperature at about 47.5 percent relative humidity for about 16 hours.

The coating cured at 121 degrees C. for 30 minutes on the steel panel is hard and glossy and exhibits good solvent resistance as shown by withstanding greater than 100 "double rubs" with a cloth soaked in methyl ethyl ketone without evidence of deterioration of the cured coating.

The coating cured an ambient temperature also is hard and glossy and evidences solvent resistance in that 61 double rubs with a cloth soaked in methyl ethyl ketone are required to wear the film down to the substrate.

EXAMPLE 3

Preparation Of Ungelled Acrylic Polymer By Reacting Acrylic Polyol, Organosilanes And Water In Continuous Process A reaction vessel equipped with condenser, stirrer, addition funnel thermometer, distillation column, and means for maintaining a nitrogen blanket is charged at ambient temperature with 1,985 g of methyltrimethoxysilane and 20.1 g of gamma-aminopropyltriethoxysilane, and the contents of the vessel are heated over a period of 16 minutes to 57 degrees C. at which point the controlled addition of water to the contents of the vessel is begun and heating is discontinued. While the contents of the vessel are stirred, a total of 144.5 g (8.03 moles) of deionized water is added slowly to the contents of the vessel over a period of 72 minutes while the temperature of the contents of the vessel (pot temperature) ranges between 52 to 53 degrees C. Within 6 minutes after the addition of the water is completed, the controlled addition of a further amount of gamma-aminopropyltriethoxysilane to the contents of the vessel is begun. While the contents of the vessel are stirred, a total of 178.9 g of gamma-aminopropyltriethoxysilane is added slowly to the contents of the vessel over a period of 28 minutes while the pot temperature ranges between 53 and 58 degrees C. Within 4 minutes after the addition of the gamma-aminopropyltriethoxysilane is completed, the addition of the diglycidyl ether of hydrogenated Bisphenol-A (DRH-1510 from Shell Chemical Company) is begun. While the contents of the vessel are stirred, a total of 178.9 g of the DRH-1510 is added slowly to the contents of the vessel over a period of 52 minutes. After the addition of the DRH-1510 is completed the contents of the vessel are held at 60 to 64 degrees C. for 1 hour. Next, the contents of the vessel are heated to reflux over a period of 7 minutes and held at 69 to 71 degrees C. for 1 hour. Thereafter the contents of the vessel are cooled to between 50 and 60 degrees C. and then 1494.5 g of a hydroxyl-functional acrylic polymer[1] (containing about 1.09 equivalents of OH) is added to the contents of the vessel. Heating is resumed for a period of 3 hours and 39 minutes while the temperature of the contents of the vessel (pot temperature) ranges between 73 and 92 degrees C. (heat temperature between 50 and 69 degrees C.) until a total of about 800 ml of distillate has been collected at which point heating is discontinued and the contents of the vessel allowed to cool to ambient temperature. The total amount of distillate collected weighs 786 grams. The resulting product is an ungelled acrylic resin composition of the invention and has a viscosity of 2.0 stokes, an epoxy equivalent weight of infinity, and a color value of less than 1. The percent by weight total solids content of a sample of the product measured at 150 degrees C. for 2 hours is 48.2 percent.

[1] An acrylic polyol resin (30.0% by weight methyl methacrylate, 25.0% by weight styrene, 19.0% by weight butyl methacrylate, 12.0 percent by weight 2-ethylhexyl acrylate and 14.0% by weight hydroxylethyl acrylate) at from 58 to 60 percent by weight resin solids in a mixture of solvents (74.7% by weight butyl acetate, 15.1% by weight naphtha, and 10.2% by weight toluene) and having a Gardner-Holdt bubble tube viscosity of about X-Z+.

What is claimed is:

1. A substrate having thereon a cured film comprising a nonaqueous composition comprising: an ungelled acrylic resin composition containing an arcylic polymer having in a molecule thereof at least one group containing a silicon atom said group selected from:

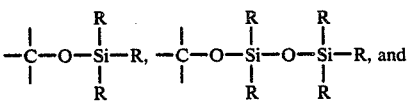

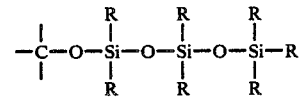

wherein each R independently is selected form the group of moieties consisting of Y, hydrogen, a $C_1$–$C_{10}$ group joined to Si through an Si-C linkage, and OR-[7]—in which R[7]—represents alkyl having at least 4 carbon atoms, aryl, alkylaryl, arylalkyl, aryloxyalkyl, or alkyloxyalkyl, wherein Y represents an easily hydrolyzable group; provided that said acrylic resin composition contains an amount of easily hydrolyzable Y moieties such that the ratio of the number of grams of said ungelled acrylic resin composition to equivalents of easily hydrolyzable Y moieties in said ungelled acrylic resin composition is in a range of from 40 to 667.

2. The substrate of claim 1 wherein said nonaqueous composition is curable in the presence of atmospheric moisture and a catalyst at a temperature of less than or equal to 121 degrees C. within 3 hours.

* * * * *

UNITED STATES PATENT AND TRADEMARK OFFICE
CERTIFICATE OF CORRECTION

PATENT NO. : 4,788,107

DATED : November 29, 1988

INVENTOR(S) : Wen H. Chang, Paul J. Prucnal, John R. Peffer, Edward L. Dufford and Ronald R. Ambrose It is certified that error appears in the above-identified patent and that said Letters Patent is hereby corrected as shown below:

TITLE PAGE:

In the Abstract, line 9 after the drawings, "arylaklyl" should read --arylalkyl--

In the Abstract, second paragraph, line 6, "Prefered" should read --Preferred--

In the Claims, column 24, line 31, "arcylic" should read --acrylic--

In the Claims, column 24, line 44, "form" should read --from--

In the Claims, column 24, line 47, please delete the dashes before "in" and before "represents"

Signed and Sealed this

Ninth Day of April, 1991

Attest:

HARRY F. MANBECK, JR.

*Attesting Officer*　　　*Commissioner of Patents and Trademarks*